United States Patent [19]
Tanaka

[11] Patent Number: 4,826,333
[45] Date of Patent: May 2, 1989

[54] FORM OVERLAY TYPE PRINTING APPARATUS

[75] Inventor: Kenmei Tanaka, Hyogo, Japan

[73] Assignee: Kanzaki Paper Mfg. Co., Ltd., Tokyo, Japan

[21] Appl. No.: 867,010

[22] Filed: May 20, 1986

Related U.S. Application Data

[63] Continuation of Ser. No. 631,789, Jul. 17, 1984, abandoned.

[30] Foreign Application Priority Data

Jul. 18, 1983 [JP] Japan ................. 58-131500

[51] Int. Cl.⁴ .............................. B41J 3/44
[52] U.S. Cl. ....................... 400/76; 400/68; 340/750; 340/734
[58] Field of Search ............... 400/63, 68, 76; 340/734, 726, 711, 750; 382/61

[56] References Cited

U.S. PATENT DOCUMENTS

| 3,566,361 | 2/1971 | Lavertn et al. | 340/734 |
| 3,643,252 | 2/1972 | Roberts, Jr. | 340/726 |
| 3,872,462 | 3/1975 | Lenelson | 340/734 |
| 4,085,445 | 4/1978 | Blevins et al. | 400/68 |
| 4,107,741 | 8/1978 | Lemelson | 340/721 |
| 4,125,829 | 11/1978 | Kayashima | 178/30 |
| 4,141,001 | 2/1979 | Suzuki et al. | 340/721 |
| 4,200,869 | 4/1980 | Maurayama | 340/750 |
| 4,240,758 | 12/1980 | Acesta | 400/279 |
| 4,317,114 | 2/1982 | Walker | 340/734 |
| 4,321,670 | 3/1982 | Timmons | 400/63 |
| 4,403,301 | 9/1983 | Fessel | 400/63 |
| 4,445,795 | 5/1984 | Levine et al. | 400/68 |
| 4,542,378 | 9/1986 | Suganuma et al. | 382/61 |
| 4,566,127 | 1/1986 | Sekiya et al. | 340/734 |

FOREIGN PATENT DOCUMENTS

| 1922016 | 11/1970 | Fed. Rep. of Germany | 400/63 |
| 2913513 | 10/1980 | Fed. Rep. of Germany | 400/68 |
| 110143 | 2/1980 | Japan . | |
| 71081 | 10/1980 | Japan . | |
| 2143066 | 1/1985 | United Kingdom | 400/68 |

Primary Examiner—William Pieprz
Attorney, Agent, or Firm—Finnegan, Henderson, Farabow, Garrett & Dunner

[57] ABSTRACT

A form overlay type document printing apparatus includes a format memory for storing form data, a repetition data memory for storing common data to be printed on successive documents, and a variable data buffer for storing data which is unique to such document. A printing pattern generator converts the repetition data and unique data to corresponding printing signals and a form pattern generator generates printing signals for reproducing a selected form. The printing signals corresponding to the form data and the repetition data are combined and repetitively supplied to an output buffer as long as there is no change in the form or the repetition data. The printing signals corresponding to the unique data are also supplied to the output buffer. The contents of the output buffer are supplied to a head driver which controls a printing head to generate the desired printed output. In this memory, only the unique data and data arising from a change in the form or the repetition data need be transmitted from a host computer to the printing apparatus.

3 Claims, 2 Drawing Sheets

FORM OVERLAY TYPE PRINTING APPARATUS

This application is a continuation of application Ser. No. 631,789 filed July 17, 1984 and now abandoned.

FIELD OF THE INVENTION

The present invention relates to a form overlay type document printing apparatus, in which blank paper, on which no form has been previously printed, is used and a form is printed on the paper together with characters by using a dot printer.

BACKGROUND OF THE INVENTION

A form overlay type document printing apparatus is described in each of Japanese Patent Applications No. 10143/81, and 71081/82. The printing apparatus disclosed in each of these laid-open application includes a printing data buffer and a form buffer and is advantageous in that when the same data are repeatedly printed, if form data have been transmitted once from a host computer and stored in the form buffer, it is sufficient thereafter to transmit only printing data until the form is changed. That is, it is not necessary to transmit a combination of printing data and form data from the computer every time. Also, a printing pattern and a form pattern can be generated in the printing apparatus by transmitting simple codes only. This simplifies the processing at the host computer side and reduces the amount of data that must be transmitted.

In the prior art, however, there is a problem that in the case where a document comprising a number of sheets is to be produced with the same form and with some data which varies with every sheet and some data which is common to every sheet. This situation requires the combination of the varying or unique data and the common data to be transmitted for every sheet from the computer. As a result the time required for data transmission is prolonged and the efficiency of the transmission line is reduced.

OBJECTS AND SUMMARY OF THE INVENTION

An object of the present invention is an efficient and simple form overlay type document printing apparatus.

Another object of the present invention is the reduction of duplicate data transmitted over a transmission line in connection with a form overlay type document printing apparatus.

Still another object of the present invention is to eliminate the multiple transmission of data which is common to a plurality of forms to be printed by a form overlay type document printing apparatus.

These and other objects are achieved by a form overlay type document printing apparatus comprising a printing data memory for storing variable printing data which is unique to each document to be printed and repetition printing data which is common to each document within a first succession of documents to be printed, a format data memory for storing format printing data defining a form to be printed on each document within a second succession of documents to be printed where the second succession of documents includes the first succession of documents, means for combining the format printing data, the repetition printing data, and the variable printing data to produce print control signals corresponding to the format data, the repetition data, and the variable data for each document to be printed, means for producing printed documents corresponding to the print control signals, and means for transferring to the printing data memory the variable printing data prior to the printing of each document and the repetition printing data prior to the printing of the first document in the first succession of documents and to the format data memory the format printing data prior to the printing of the first document in the second succession of documents.

BRIEF DESCRIPTION OF THE DRAWINGS

These and other objects, features, and advantages of the invention, as well as the invention itself, will become more apparent to those skilled in the art when considered in the light of the accompanying drawings wherein.

DETAILED DESCRIPTION OF THE PREFERRED EMBODIMENT

Figure 1:
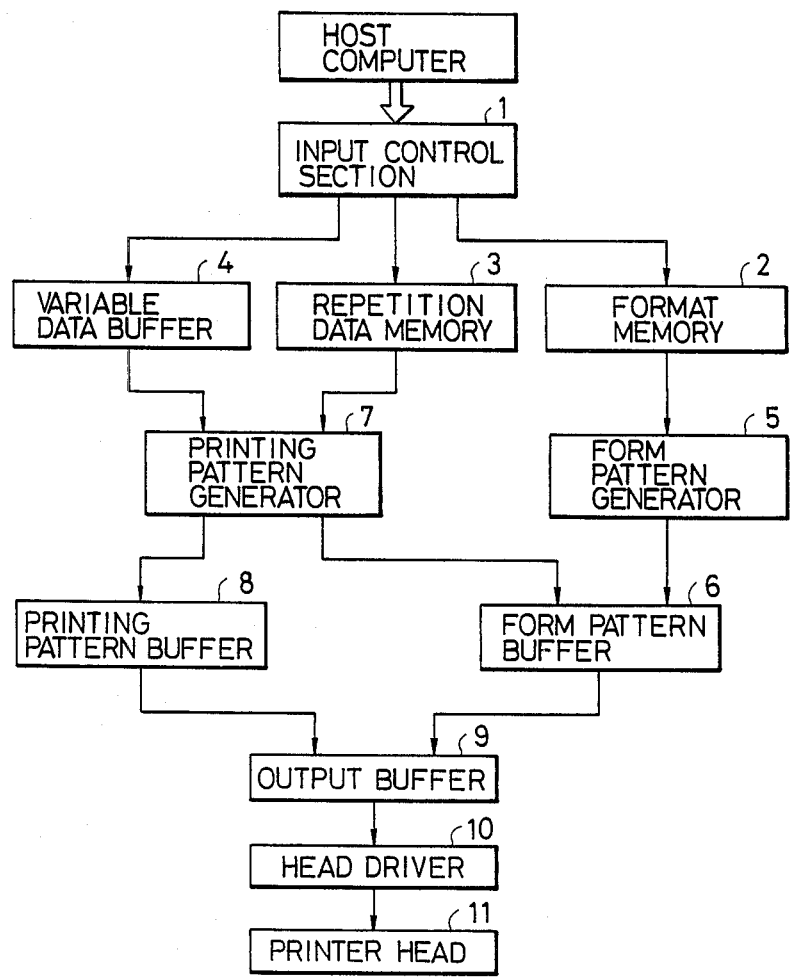
FIG. 1 is a block diagram of an embodiment of the form overlay type document printing apparatus of the present invention.
Figure 2:
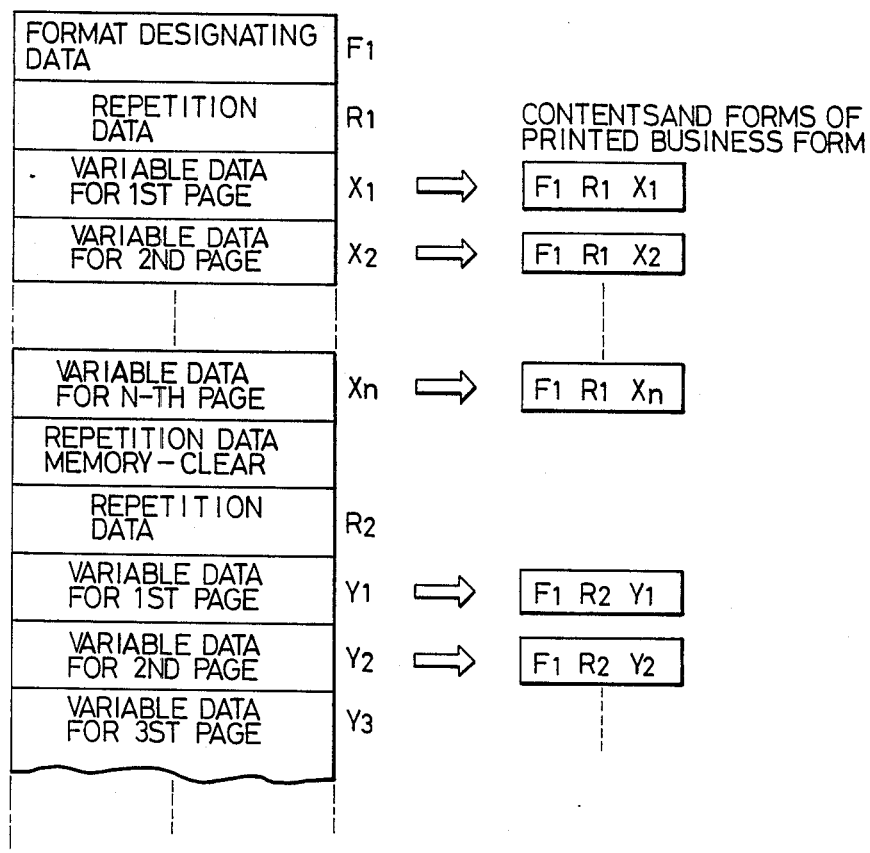
FIG. 2 is an explanatory diagram of the operation of the apparatus of FIG. 1.

FIG. 1 is a block diagram showing an embodiment of the printing apparatus according to the present invention. A transfer signal (FIG. 2) inputted into a printing apparatus from a host computer is classified into format designating data $F_1$, $F_2$ ..., repetition data $R_1$, $R_2$ ... which do not change over plural pages, and printing data $X_1$, $X_2$ ... which change with every page or document, as shown in FIG. 2.

An input control section 1 discriminates format designating data, repetition data, and ordinary printing data or variable data, out of an input signal applied from a host computer, and causes a repetition data memory 3 and a variable data buffer 4 to store the repetition data and the variable data, respectively. Each of the repetition data memory 3 and the variable data buffer 4 has the capacity for storing a page or document. Data corresponding to one line on the document are successively read out of the respective memories 2, 3 and 4.

The format memory 2 stores in advance plural kinds of formats $F_1$, $F_2$, ... The designated format data read out of the format memory 2 is converted into a format pattern by a form pattern generator 5 and the form pattern is temporarily stored in a form pattern buffer 6.

A character code read out of the repetition data memory 3 is converted into a printing pattern by a printing pattern generator 7 and ORed with the form pattern in the form pattern buffer 6. Another character code read out of the variable data buffer 4 is converted into another printing pattern by the printing pattern generator 7 and is temporarily stored in a printing pattern buffer 8. The outputs of the respective pattern buffers 6 and 8 are ORed with each other by an output buffer 9 to form a drive signal which is then applied to a head driver 10. On the basis of the drive signal, the head driver 10 drives a printer head 11.

After the format designating data, $F_1$, and the repetition data, $R_1$, have been inputted into the above-mentioned printing apparatus from a host computer, only variable data $X_1$, $X_2$, ..., $X_n$, are inputted, as shown in FIG. 2. The variable data are combined with the format data, $F_1$, and the repetition data, $R_1$, which have been respectively stored in the format memory 2 and the repetition data memory 3, to constitute a document and the contents thereof ($F_1$, $R_1$, $X_1$), ($F_1$, $R_1$, $X_2$), ..., (F1, R1, Xn), as shown in the right hand side of FIG. 2 are printed on the documents to reproduce the variable and repetitive contents.

Upon completion of printing a predetermined number of documents, that is n, the repetition data memory 3 is cleared. When the repetition data, R2, is then inputted, the repetition data memory 3 stores the new repetition data, R2, while the format designating data, F1, is left as it was because the form data, F1, has not been changed in this example. Then the variable data Y1, Y2, . . . are inputted so that the documents having form, repetition, and variable data, (F1, R2, Y1), (F1, R2, Y2), are successively printed every time the variable data are inputted for a document.

Although a thermosensitive line dot printer is used in this embodiment, the present invention can be achieved by using any type of recording system, such as electrostatic, ink jet, electrophotographic, electrodischarge, electrolytic, magnetic, etc., and any type of head structure, such as a line dot system, a dot matrix system, etc.

According to the present invention, as described above, in a form overlay type document printing apparatus in which a printing data buffer and a form buffer are provided separately so that only printing data are transferred from a host computer unless form data are changed, printing data for one document is divided into a part which is repeated without changing over a plurality of documents and a part which changes with every document so that only the variable data are transferred from the host computer unless the repetition data are changed. The respective data corresponding to every line of a document are read out of a format memory, a repetition memory, and a variable data buffer and are converted into printing patterns. The patterns are combined and outputted to the printing apparatus. Thus, in comparison with the conventional overlay type document printing apparatus, in which all the printing data other than the format data are transferred for every page, the printing apparatus of the present invention has an advantage that the amount of data to be transferred is reduced so that not only the transferring time is reduced but the processing by the computer can be simplified.

While the salient features of the invention have been described with reference to the drawings, it should be understood that the described embodiment is susceptible of modification without departing from the spirit and scope of the following claims.

What is claimed is:

1. A method of sequentially printing pages of a form overlay type document by a printing apparatus, said method comprising the steps of:
   transmitting from a host computer a set of form data which remains unchanged for a predetermined number of sequentially-printed pages, said form data being transmitted only once for said predetermined number of pages;
   transmitting from a host computer repetition data which re-mains unchanged for a first number of said predetermined number of sequentially-printed pages, said repetition data being transmitted only once for said first number of pages;
   transmitting from a host computer variable data which changes for each of said first number of pages;
   storing said form data, said repetition data, and said variable data at said printing apparatus;
   merging said form data, said repetition data, and said variable data at said printing apparatus for printing said pages of said documents, said merging step including the substeps of
   generating a format pattern from said stored form data,
   generating repetition printing patterns form said stored repetition data,
   combining said repetition printing patterns and said format pattern to create form pattern buffer signals,
   generating variable printing patterns from said stored variable data, and
   combining said generated variable printing patterns with said generated form pattern buffer signals to create a drive signal for printing; and
   sequentially printing said predetermined number of pages by said printing apparatus using said printing apparatus and said drive signal.

2. The method in claim 1 further including the step of transmitting repetition data a single time for a second number of said different predetermined number of sequentially-printed pages, said second number of pages not including said first number of pages; and
   transmitting different variable data for each of said second number of sequentially printed pages.

3. The method of claim 1 further including the steps of:
   storing said form pattern signals in a form pattern buffer;
   storing said variable printing patterns in a printing pattern buffer; and
   storing said drive signals in an output buffer.

* * * * *

UNITED STATES PATENT AND TRADEMARK OFFICE
CERTIFICATE OF CORRECTION

PATENT NO. : 4,826,333

DATED : May 2, 1989

INVENTOR(S) : Kenmei Tanaka

It is certified that error appears in the above-identified patent and that said Letters Patent is hereby corrected as shown below:

Claim 1, column 4, line 10, change "re-mains" to --remains--.

Claim 1, column 4, line 25, change "form" to --from--.

Abstract, line 17, change "memory" to --manner--.

Signed and Sealed this

Twenty-eighth Day of August, 1990

Attest:

HARRY F. MANBECK, JR.

*Attesting Officer*  *Commissioner of Patents and Trademarks*